Nov. 13, 1951     J. L. COONEY     2,575,209
AIR PILOT VALVE
Filed Jan. 28, 1946     2 SHEETS—SHEET 1
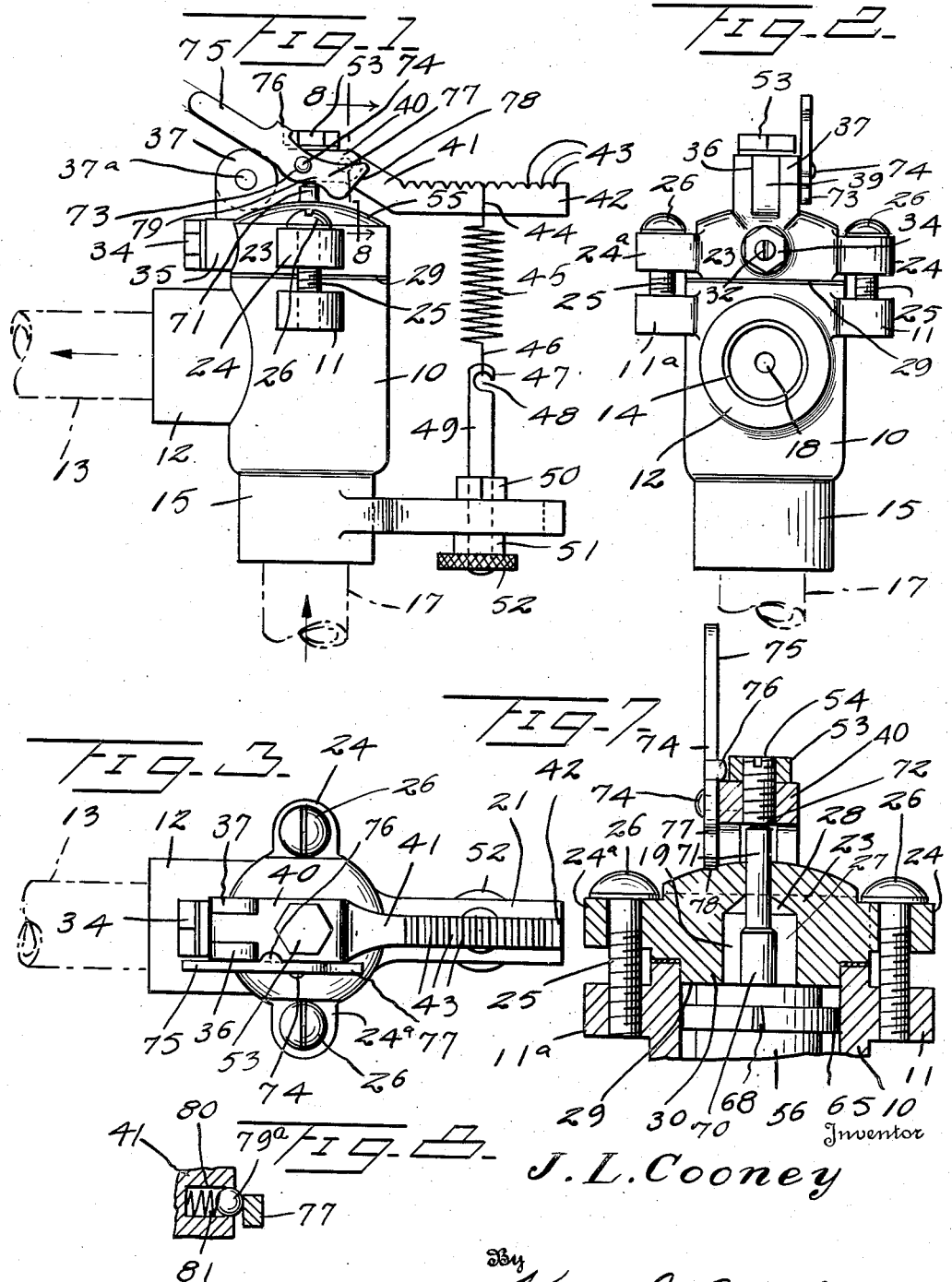
Inventor
J. L. Cooney
By Kinnel & Crowell Attorneys

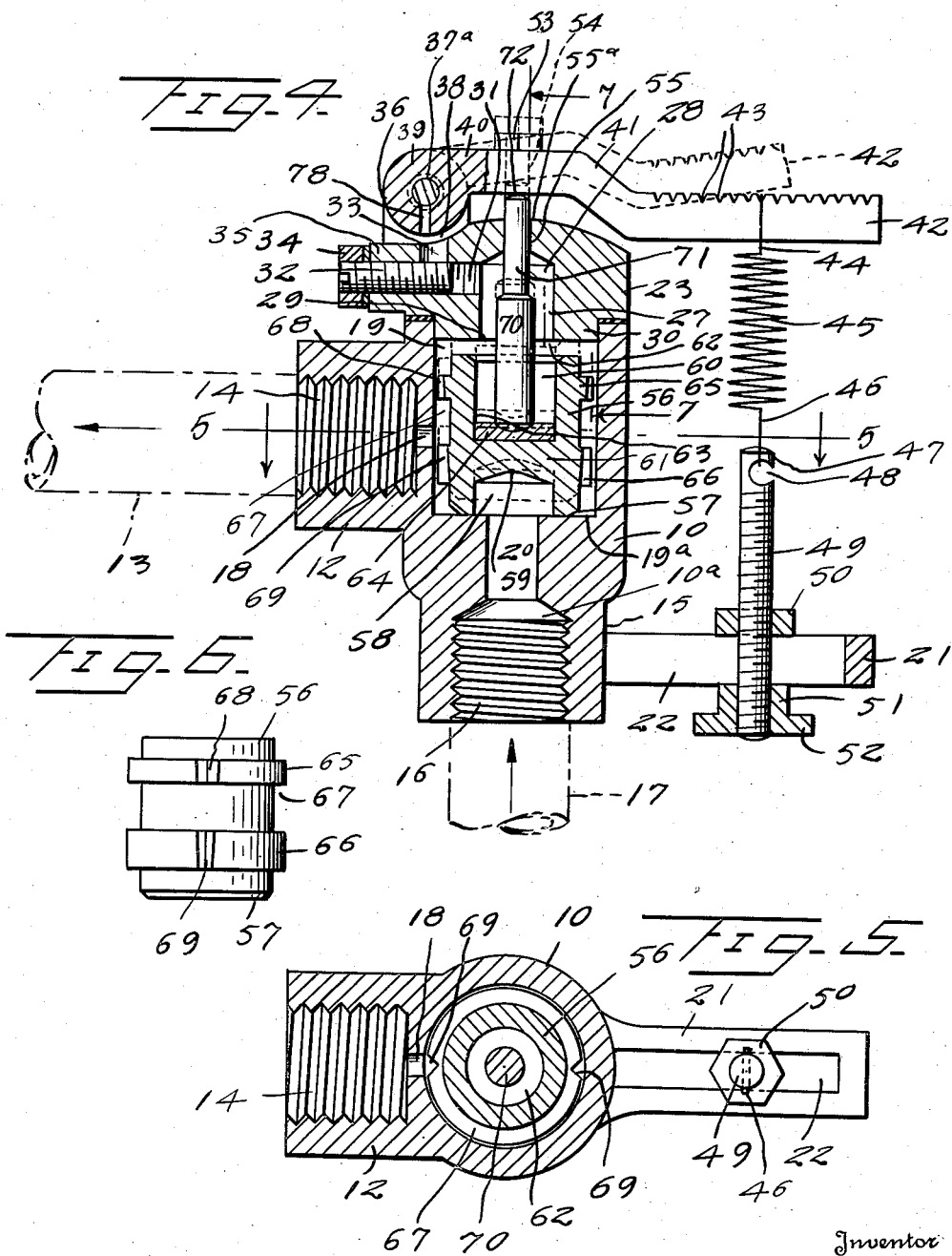

Patented Nov. 13, 1951

2,575,209

UNITED STATES PATENT OFFICE 2,575,209

AIR PILOT VALVE

John L. Cooney, Erie, Pa.

Application January 28, 1946, Serial No. 643,940

3 Claims. (Cl. 251—118)

The present invention relates to pressure responsive valve apparatus and more particularly air pilot valves and the like regulatory fluid-controlling devices.

One of the objects thereof is to provide a simple, efficient and inexpensive valve fitting equipped with fluid venting means therefor as well as controlling means therefor.

Another object of the invention is to provide, in a device of the kind described, means for regulating the fluid pressure in the valve casing or body whilst allowing venting of the air out of the casing.

Another object of the invention is to provide in a device of the character described an improved valve means for controlling the admission of fluid into and out of the casing, which means also provides for venting the casing when necessary.

A still further object thereof is to provide, in a device of the kind described, means for holding the valve to its fluid-controlling seat under spring pressure, with provision for freeing said valve from said spring pressure whenever this is desirable.

Another object of the invention is to provide, in a device of the character described, improved means controlling movements of the valve in its casing with a view to controlling simultaneously or separately its function of discharging fluid therefrom or air therefrom, as the case may be.

Another object thereof is to provide efficient means for lubricating the frictional bearings of the fluid regulating means.

A final object of the invention is to provide reliable means for gaining access into any part of the valve structure for cleaning, replacement or repairing purposes.

With the above and other objects in view, my invention consists in the combination, arrangement and details of construction, disclosed in the drawings and specification, and then more particularly pointed out in the appended claims.

In the drawings:

Figure 1 is a side elevation of my invention.

Figure 2 is an end elevation thereof.

Figure 3 is a top plan view thereof.

Figure 4 is a sectional elevation thereof.

Figure 5 is a cross section taken on the line 5—5 of Figure 4.

Figure 6 is a side elevation of the valve proper.

Figure 7 is a section detail of the upper part of my invention.

Figure 8 is a fragmental detail view showing a lever-engaging tappet.

Referring to the drawings, which are merely illustrative of my invention, I disclose the component details thereof. A cylindrical valve casing 10 has a pair of diametrically opposite lugs 11, 11a formed at its upper end, and has a fluid outlet nipple 12 internally threaded at 14 for the threaded reception of a pipe 13. At right angles relatively to outlet nipple 12, is an inlet fluid nipple 15, into whose internally threaded throat 16 is also threaded a pipe 17, the casing having a lateral outlet port forming a constricted orifice 18 which registers with outlet nipple 12. The casing is formed with a coaxial chamber 19, cylindrical in cross-section, and also with a valve inlet seat 19a extending at right angles to the outlet nipple 12, which seat has an inlet port 20 registering with inlet nipple 15.

The casing is formed, at its lower end, with an outwardly projecting arm 21 at right angles thereto, in which is formed an elongated slot 22. There is a valve bonnet or cap of cylindrical formation 23, which is formed at diametrically opposite points with lugs 24, 24a. The bonnet has a reduced boss 30 which seats within chamber 19 of the casing, and closes the chamber at this end. After lugs 11, 11a are brought into registration coincidingly with lugs 24, 24a of the valve bonnet, cap screws 25 are threadedly tapped into both sets of lugs, so that their screw heads 26 abut the upper lugs 24, 24a as shown in Figure 2.

The surface 29, of the bonnet provides a valve seat at the end of the chamber 19 opposite to valve seat 19a, and the bonnet is formed with a cavity 28 which opens out of seat 29, and communicates with chamber 19, as shown in Figure 4.

A gasket 27 may be interposed between bonnet and casing, if desired. Communicating with cavity 28 is a lateral air vent orifice 31, internally screw-threaded, which opens out to the atmosphere, and threaded into said orifice is a pin valve 32 upon whose outer end a clamping nut 34 is screwed, and abuts the boss 35 formed upon the bonnet.

The vent 31 is provided for exhausting fluid from conduit 5 and the device associated therewith and for relieving back pressure which might interfere with the opening of the valve 56 from the seat 19a. The vent 31 and valve 32 will be open to a selected extent at all times during the operation of the valve 56.

Opening out of the port 31, at the top of the bonnet, is an air vent hole 33 that can be increased or decreased as desired by pin valve 32.

The bonnet is formed with a pair of oppositely arranged closely adjacent lugs or ears 36, 37 in a plane with the vent hole 33, and mounted between these ears on a pintle 32a is the inner rounded end 39 of a lever 40 having an offset depressed portion 41 which terminates in a handle arm 42, making a fulcrum and lever upon whose upper edge is longitudinally formed a series of serrations or flutes 43. Lever 40 is fulcrumed on pintle pin 37a which passes through one lug and is threaded into the other lug. One terminal 44 of an expansible coil spring 45, is hooked onto any of the flutes 43 of the handle 42 of lever 40, and its opposite terminal 46 is hooked onto a hook 47 formed upon one end of a screw bolt 49, entrance into the hook being had by inserting the spring hook into notch 48 of the hook 47. The screw bolt 49 projects through slot 22 of arm 21 and has an adjusting nut 50 also threaded thereon engaging above one face of the arm 21 and a nut 51 which engages the other face of the arm, said latter nut having a circular knurled operating head or flange 52.

The lever 40 has an adjusting screw 53 tapped thereinto (Figure 7), held in set position therein by the lock nut 54 threaded onto its projecting end. Arranged to contact this screw 53 is the pusher rod 71 about to be described. The top 55a of the bonnet has a bore 55 formed therethrough which registers with its cavity 28.

I will now describe the special formation of valve employed in the valve casing. It is an all-fiber piece, shaped to a cylindrical contour, as shown in Figure 6. Between its ends one or more flanges are formed upon it, two being shown, designated 65 and 66. The lower valve seat engaging end of the valve is conically tapered, as at 57. This valve is mounted in chamber 19 being of lesser length with respect thereto, so that when its conical end 57 rests upon valve seat 19a there will be clearance 62 between the opposite end of the valve and the valve seat surface 29 of the bonnet. As thus positioned in chamber 19, there is an annular channel 67 between the valve 56, and the adjacent wall of the chamber. The flanges 65, 66 of the valve make a snug engagement with the wall of the chamber. On them are formed, respectively, V-notches 68 and 69 which communicate with the annular channel 67.

A pusher pin 70 has a reduced forwardly projecting terminal 71 which is slidably mounted in the bore 55a in the top of the bonnet 23 and its rounded extremity 72 is in contact with adjusting screw 53 on lever 40. The other end of the pusher pin is rounded, being centered into a correspondingly shaped conical cavity formed in a washer 64 made of metal, which is snugly fitted into the bottom of a chamber 63 formed in the valve 56 on one side of the cross partition 61 thereof. The pusher pin, in this way, is centered in both bonnet and valve for slidable movement in the bonnet. On the other side of partition 61 is formed a chamber 58 whose inner plane is pointed inwardly as at 59.

There is a small lever 75 pivoted upon pin 74 mounted upon the lever 40 in eccentric relation to the hinge thereof, so that a minor portion of the length of this lever constitutes a cam 79 forming at 77 the widest part of the lever, the bottom edge of the cam being straight, as at 78. The length of the minor portion of the lever 75 which is formed with the cam is greater than the distance between pivot pin 74, and the adjacent part of the top 55 of the bonnet, so when the lever 75 is taken hold of and pulled upwardly to assume the perpendicular position shown in Figure 7, where the straight edge 78 of the cam 79 engages abuttingly this part of the bonnet, lever 40 upon which lever 75 is mounted will be elevated. The lever 75 is formed with a laterally offset shoulder 76 (Figures 1 and 7).

Lever 40 is formed with a lateral socket 80 (Figure 8) in the inner end of which is lodged a pressure spring 81. One end of the spring is operatively fastened to a tiny ball 79a, which is pressed inwardly slightly by the lever cam 79 when said lever makes a side swipe against this ball in the course of its movement. The ball 79a will engage the edges of the cam 79 to hold the lever 75 against inadvertent rocking movement.

The operator turns the nuts 50, 51 for increasing or lessening the tension upon the spring 45, with regard to pulling down arm 42 of lever 40 a greater or lesser distance. The operator moves the spring away from or towards valve casing 10, which lengthens or shortens the effective leverage on the arm 42 of lever 40 to vary the tension pulling down arm 42 of lever 40, thus increasing or decreasing the air pressure required to raise valve 56 from its seat 19A. Since the screw 53 of lever 40 bears upon the rounded end 72 of the pusher pin 71, the exact amount of pressure upon this pin may be regulated by means of screw bolt 49, and in turn the pusher pin will press down upon valve 56, causing the outer conical end 57 thereof to contact firmly the valve inlet seat 19a. This closes the inlet port 20 of the casing, if the spring pressure imposed upon arm 42 of lever 40 is more than sufficient to balance the fluid pressure of the fluid seeking entrance into chamber 19 of the valve by way of inlet nipple 15. This pressure is, therefore, adjusted so that, if desired, fluid pressure may lift valve and raise it from seat 19a, so as to uncover inlet port 20, the valve moving upwardly so as to contact seat 29 of the bonnet 23.

This position of the valve closes cavity 28 of the bonnet and as the valve moves upwardly it carries pusher pin 71 along with it, the latter pressing upwardly against lever 40, and causing arm 42 of this lever to stretch the coils of spring 49 yieldingly. As this takes place fluid is entering chamber 19 of the valve to raise it. Since there is now clearance between valve and seat 19a, some of the fluid enters the annular channel 67 between valve and chamber wall.

When valve 56 closes cavity 28, at the end of its upward stroke some of the fluid which got into channel 67 by way of the V-notches 68, 69 in flanges 65, 66 of the valve is free to make exit out of orifice 18 into and out of outlet nipple 12 of the valve casing 10. For increased fluid pressures in chamber 19 of the valve or in the casing the spring-pressed lever 49 acts as a safety expedient, as it is raised accordingly under fluid pressure against the valve. When a continuous flow of fluid out of outlet nipple 12 is desired, the operator takes hold of lever 75, pulls it upwardly so it assumes a perpendicular position with cam 79, resting upon top of the bonnet (Figure 7) whereupon lever 40 is raised and assumes the dotted line inclination illustrated in Figure 4. As long as lever 75 is in this vertical position, lever 40 is raised, valve 56 remains on seat 29 and acts as a stop to limit the upward movement of the pusher pin 71, as shown in dotted lines in Figure 4.

The fluid, which is being discharged out of nipple 12, no longer has to encounter spring opposition or pressure, but simply holds valve unseated from inlet port 20. The pusher pin may be pressed downwardly by disengaging lever 75 from the valve bonnet, by turning it down into inclined position shown in Figure 1. As this takes place spring 45 contracts and pulls down upon arm 42 of lever 40, causing this lever to press valve 56 down upon seat 19a. This opens cavity 28, and when pin valve 32 is adjusted far enough, air vent 33 is uncovered so air may escape out of chamber 19 to the atmosphere of cavity 28.

The pilot valve functions as follows: The compressor is started initially, it is assumed that there is no pressure on the receiver or lines connected thereto, the prime mover is energized through any medium, belt, steam or electricity, putting the compressor in motion, it being understood, that a compressor usually operates to supply a pre-determined pressure.

When this pre-determined pressure is reached, the pilot valve being set for it, then begins to function; the fluid air enters inlet port 20 moving piston valve 56 from its seat 19A to the seat 29 on the bonnet 23. During this short interval of travel the fluid air is communicated to chamber 28 to air vent orifice 31 and to atmosphere through air vent hole 33 that intersects air vent orifice 31 in the bonnet. Piston valve 56 remains in this position in contact with seat 29 in the bonnet as long as the air of predetermined pressure remains constant allowing air to escape through the orifice 18 which registers with the outlet nipple 12. This is attached to a device known as an unloader; this device frees the compressor of its load.

When pressure on piston 56 drops a pre-determined amount, tension on spring 45 which is attached to lever 42 by its upper loop, exerts a downward pull on arm 42 of lever 40 depressing the push pin 70 which transfers this motion through its lower extremity to piston valve 56 thereby, returning valve 56 to its seat 19A over the chamer 20 causing the valve on the unloader to close, thereby, causing the compressor to begin to function and load up the receiver to the aforementioned pre-determined pressure for which the pilot is set. This cycle is repetitive as long as the prime mover continues to function or air is reduced below the predetermined pressure in the lines.

In the rounded end 39 of lever 40 is a hole 78 at right angles to lever 40 which opens out into the space 38 between lever 40 and the bonnet 23. It will be noted that during the cycle of the valve small quantities of air are discharged to the atmosphere, carrying along with same minute particles of oil which have access to the bell mouth orifice in rounded end 39 of lever 40, thereby lubricating pintle pin 37A when it passes through lever 40 at its rounded end 39 and since orifice 33 is larger than the bell mouth orifice the excess impinges on the adjacent walls of lever 40 and lugs 36 and 37, thoroughly lubricating them.

I claim:

1. An air pilot valve comprising a casing formed with a fluid inlet port at one end thereof, a vent port at the other end thereof, and a fluid outlet port disposed therebetween which is constantly in communication with whichever of said first two ports is open, a valve slidable in said casing closing said fluid inlet port at one end and closing said vent port at the other end of said casing, spring means including a lever on said casing biasing said valve to inlet port closing position, said casing formed with a vent orifice above said valve, and an aperture bearing boss for said lever in alignment with said vent orifice for lubricating said bearing.

2. An air pilot valve comprising a casing formed with a fluid inlet port at one end thereof, a vent port at the other end thereof, and a fluid outlet port disposed therebetween which is constantly in communication with whichever of said first two ports is open, a valve slidable in said casing closing said fluid inlet port at one end and closing said vent port at the other end of said casing, spring means including a lever on said casing biasing said valve to inlet port closing position, said casing formed with a vent orifice above said valve, an aperture bearing boss for said lever in alignment with said vent orifice for lubricating said bearing, and valve means regulating said vent orifice.

3. An air pilot valve comprising a casing having an upwardly opening cylindrical bore formed therein, a reduced diameter fluid inlet port formed in the lower end of said casing and communicating with said bore, a head member on said casing formed with a downwardly opening bore therein adapted to communicate with said casing bore, a lateral tapped passage formed in said head member and communicating at its inner end with said head bore, an upwardly opening vent port formed in said head member and communicating with said tapped passage, a threaded valve in said tapped passage adapted to regulate the flow through said vent port, a lateral fluid outlet port formed in said casing and communicating with said cylindrical bore intermediate the length of the latter, a valve member slidable within said cylindrical bore formed with circumferentially extending notched ridges and adapted to close said downwardly opening head member bore at the upper end of said casing, and said fluid inlet port at the lower end of said casing, said fluid outlet port being in constant communication with whichever is open, a pair of ears formed on said head and supporting a pivot pin in the plane of said vent port, a spring pressed lever having a boss on one end pivotally carried by said pin, an aperture formed in said boss communicating with said pivot pin and adapted to confront said vent port, and a plunger extending through said head for engagement with said lever and said valve member.

JOHN L. COONEY.

REFERENCES CITED

The following references are of record in the file of this patent:

UNITED STATES PATENTS

| Number | Name | Date |
|---|---|---|
| 231,592 | Leach | Aug. 24, 1880 |
| 972,281 | Stamets | Oct. 11, 1910 |
| 1,523,716 | Raymond | Jan. 20, 1925 |
| 1,601,943 | Conrader | Oct. 5, 1926 |
| 2,049,211 | Loweke | July 28, 1936 |
| 2,272,926 | Squiller | Feb. 10, 1942 |

FOREIGN PATENTS

| Number | Country | Date |
|---|---|---|
| 96,092 | Sweden | Apr. 27, 1939 |